May 27, 1958 — J. W. SMITH — 2,836,472

GUIDE BEARINGS

Filed April 27, 1956

United States Patent Office 2,836,472
Patented May 27, 1958

2,836,472

GUIDE BEARINGS

John William Smith, Rugby, England, assignor to The English Electric Company Limited, London, England, a British company Application April 27, 1956, Serial No. 581,040

Claims priority, application Great Britain May 10, 1955

3 Claims. (Cl. 308—134.1)

This invention relates to guide bearings, preferably for the vertical shafts of hydraulic turbines or pumps which are made self-lubricating by the viscosity drag of the rotating surface pumping lubricating oil from a sump into peripheral grooves provided in the surface of the bearing pads from where the oil is discharged in the direction of rotation at the end of each pad.

For turbines or pumps rotating always in the same direction such self-lubricating viscosity pump action has been successively used. However, for hydraulic machines which have to run alternatively in opposite directions, according to whether they are actually operated as turbines or as pumps, it is not possible to use the simple viscosity pump arrangement referred to, because the action thereof is uni-directional.

According to the present invention the peripheral groove in each bearing pad is in communication with the oil sump at both ends through a non-return valve opening inwardly, and to the interstitial space between adjacent bearing pads through a non-return valve opening outwardly. Depending on the sense of rotation, the non-return inlet valve at the rear end of each groove will be opened by the viscosity drag of the oil, and the non-return discharge valve at the forward end thereof will be opened by the oil pressure building up in the said groove, the two other non-return valves being closed.

The inlet non-return valves are for example constructed as ball valves, and the outlet non-return valves as leaf springs.

Figure 1:
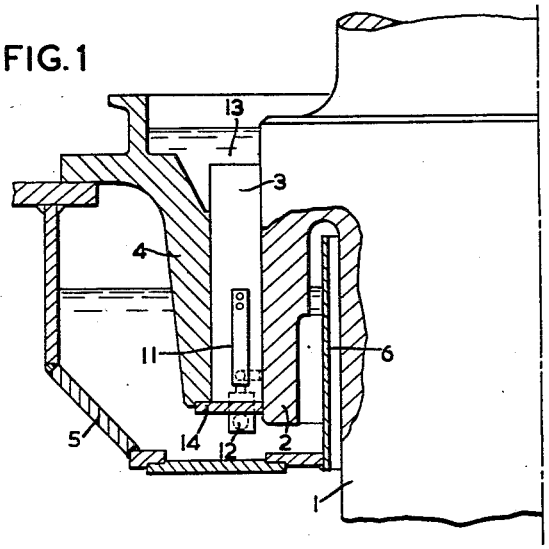
Figure 2:
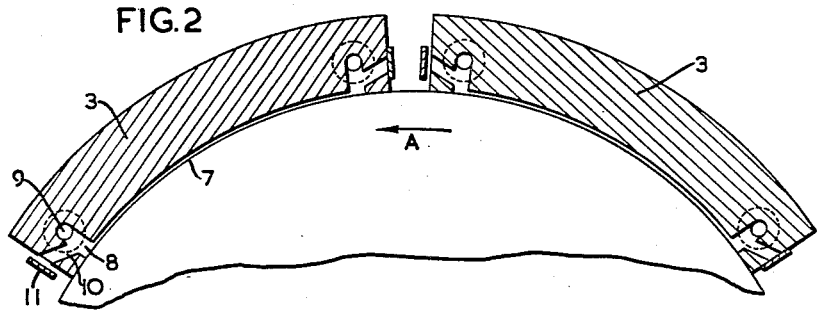
Figure 3:
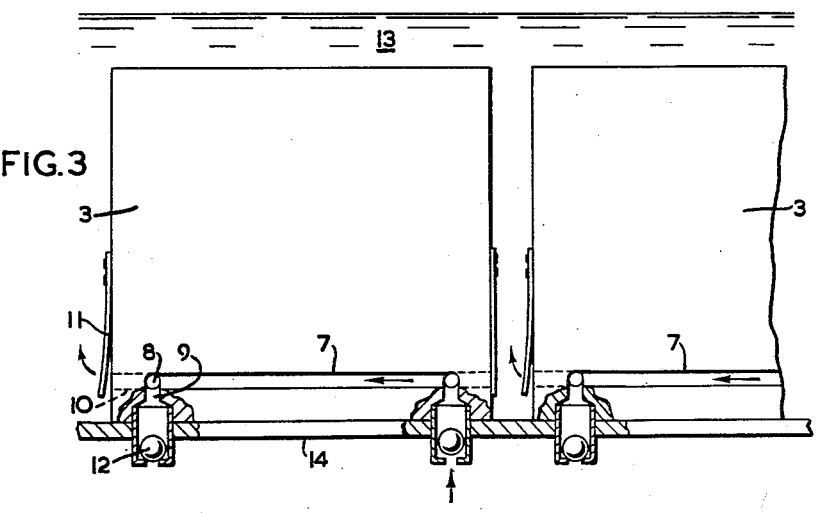

In order that the invention may be clearly understood, an embodiment thereof will now be described by way of example with reference to the accompanying drawing, in which:

Fig. 1 is a longitudinal part section of a guide bearing of a combined hydraulic turbine and pump having a vertical shaft, Fig. 2 is a part cross section thereof, and Fig. 3 a developed elevation to Fig. 2, Figs. 2 and 3 being on a larger scale than Fig. 1.

The shaft 1 has an integral collar 2 which is journalled in the pads 3 of a guide bearing 4. These pads 3 and the collar 2 dip into an annular lubricating oil sump 5 which has an internal sleeve 6. Each pad 3 has on its bearing surface near its lower edge a peripheral groove 7 which communicates through short radial bores 8 at each end with a short vertical duct 9 and with a short horizontal duct 10. The ducts 10 lead to the interstices between adjacent bearing pads 3 which are on top in open communication with an annular upper oil reservoir 13 surrounding the shaft 1, and are closed at the bottom by an annular plate 14. Leaf springs 11 form non-return valves opening outwardly from the said ducts 10 towards the said interstices under a pressure building up in the said grooves 7 by viscosity action, as indicated in Figs. 2 and 3.

The vertical ducts 9 lead through non-return ball valves 12 arranged in the said annular plate 14 to the said sump 5. In Fig. 3 it is indicated that the valve 12, which is at the rear of a pad in the sense of rotation of the arrow A of Fig. 2, is opened by the suction effect of the viscosity drag set up in the groove 7, while the valve 12 at the forward end is closed by the internal pressure.

When the sense of rotation of the shaft 1 is reversed, those non-return valves shown open in Figs. 2 and 3 are automatically closed, and those shown closed are opened. This viscosity pump arrangement accordingly acts self-lubricating in both directions of rotation.

What I claim as my invention and desire to secure by Letters Patent is:

1. A self-lubricating viscosity vertical shaft bearing comprising in combination: a bearing casing in operation containing an upper oil level, spaced bearing pads mounted in the said casing the spaces between said pads being in communication with the said casing, an oil sump enclosing the said casing and pads from outside, from underneath and from inside and in operation containing a lower oil level, peripheral oil grooves being provided at the bearing faces of the said pads adjacent the lower ends thereof and bores being provided in the said pads connecting both ends of the said peripheral grooves to the said bearing casing as well as to the said sump, non-return valves outwardly opening from the said bores towards the said casing and non-return valves inwardly opening from the said sump towards the said bores.

2. A self-lubricating bearing as claimed in claim 1, wherein the said outwardly opening non-return valves each comprise a leaf spring, fixed at one end to a side face of a bearing pad and with the other end resiliently closing the exit of one of the said bores into the said bearing casing.

3. A self-lubricating bearing as claimed in claim 1, wherein the said inwardly opening non-return valves each comprise a cage tightly connected to one of the said bores and having a port opening into the said sump and forming a valve seat, and a ball adapted to rest on the said seat and closing the same under the action of an excess pressure from the side of its associated bore, and to be lifted off said seat and allowing communication between said sump and said bore under the action of a reduced pressure from the side of said bore.

References Cited in the file of this patent

UNITED STATES PATENTS 1,806,061    Howarth _____ May 19, 1931